Figure 1:
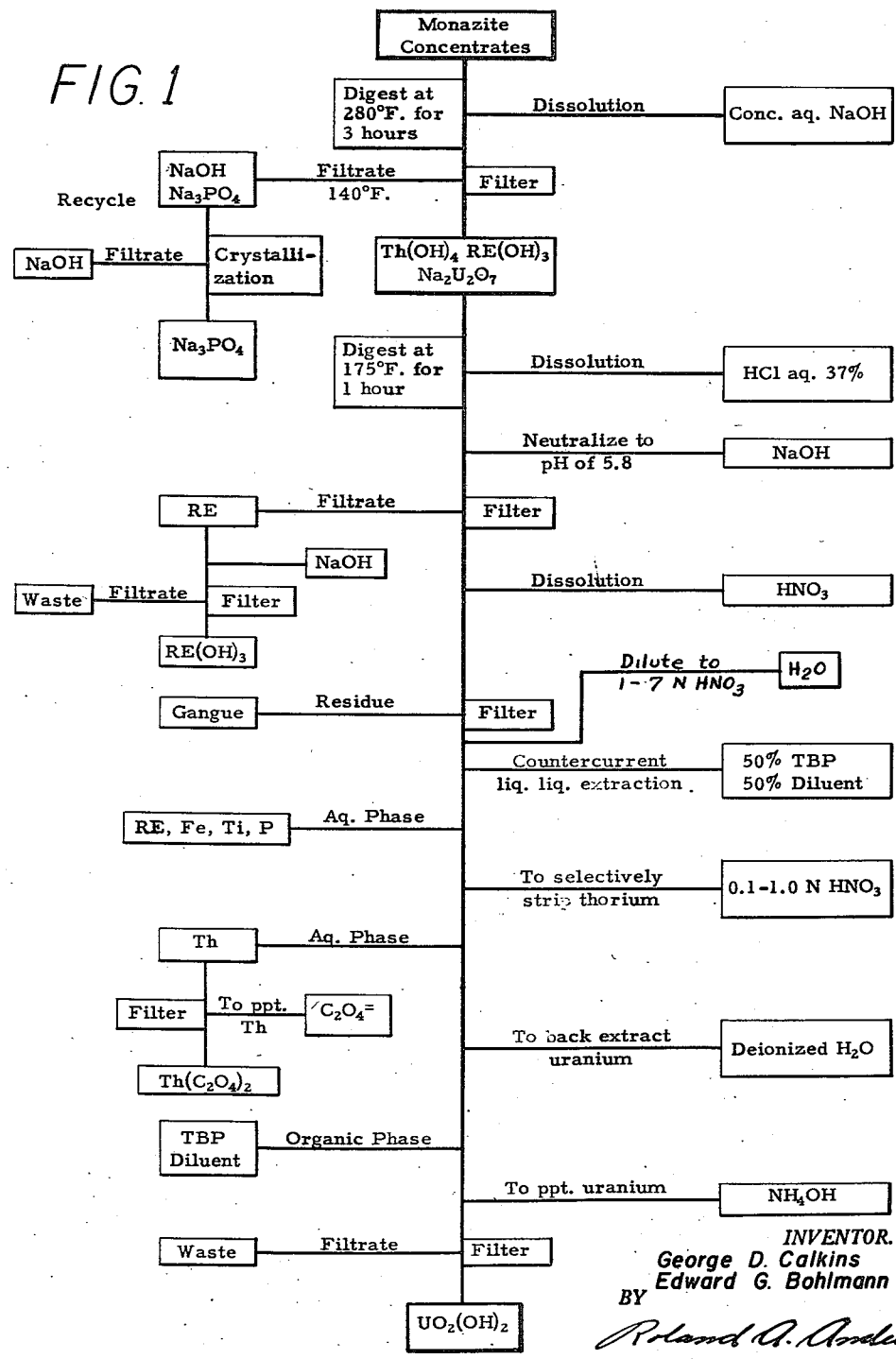

Dec. 3, 1957     G. D. CALKINS ET AL     2,815,264

PROCESSING OF MONAZITE SAND

Filed Oct. 9, 1953     2 Sheets-Sheet 1

INVENTOR.
George D. Calkins
Edward G. Bohlmann
BY Roland A. Anderson
ATTORNEY

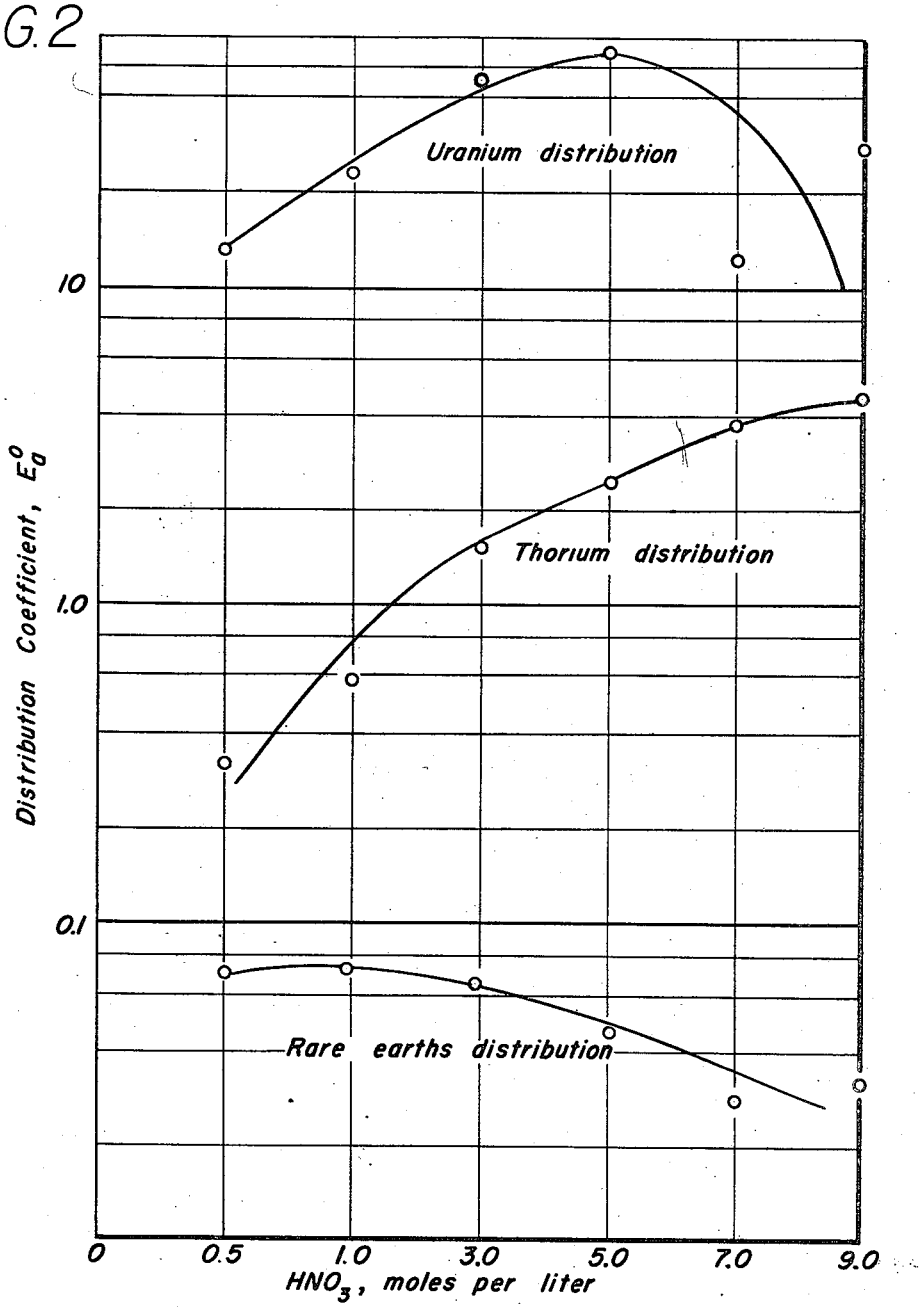

United States Patent Office 2,815,264
Patented Dec. 3, 1957

2,815,264

PROCESSING OF MONAZITE SAND

George D. Calkins, Columbus, Ohio, and Edward G. Bohlmann, Oak Ridge, Tenn., assignors to the United States of America as represented by the United States Atomic Energy Commission Application October 9, 1953, Serial No. 390,770

3 Claims. (Cl. 23—14.5)

The present invention is concerned with a process for the recovery of thorium, uranium, and rare earths from their ores, particularly monazite sand.

The most important source of thorium and the rare earths is monazite sand. Monazite sand is a beach sand composed primarily of rare earth phosphates and is derived from the weathering of granites, gneisses and pegmatites. In addition to the rare earth phosphates, it normally contains thoria, a minor amount of uranium in the form of $U_3O_8$ and minor amounts if iron oxide, titania and silica. The rare earth oxide content may run as high as 86%, the thorium oxide content as high as 10%, and the uranium oxide ($U_3O_8$) as high as 1%. Various methods have been developed for the processing of monazite sand. The most common method comprises the digestion of the sand with concentrated sulfuric acid, the dissolution of the products in cool water and fractional precipitations and crystallizations to recover the rare earths and thorium. In this method no attempt is made to recover the uranium. Other methods of treating the sands have been developed, such as direct treatment of the sand with hot concentrated nitric acid, treatment with perchloric acid, treatment with sodium peroxide, pyrometallurgical treatment with magnesium oxide, and fusion with caustic soda. In the main, however, these methods are either inefficient, expensive, or produce products from which it is difficult to recover some of the minor components such as the uranium.

It is an object of the present invention to provide a method for the treatment of phosphatic ores of thorium, uranium and rare earths for the over-all recovery of thorium, uranium and rare earths that will be efficient and inexpensive.

It is a further object of the present invention to provide a process for the recovery of a substantially pure thorium product from monazite sand concentrates.

It is a still further object of the present invention to provide a process for the treatment of monazite sand which will provide a substantially pure uranium product and a rare earth product in a usable form.

Further objects of the present invention will be apparent from the description which follows.

According to the process of the present invention monazite sand concentrates are first finely divided. These finely divided concentrates are then digested at elevated temperatures with a concentrated aqueous hydroxide solution whereby the sand is dissolved and water-soluble sodium phosphate and sodium silicate, and water-insoluble compounds of thorium, uranium and rare earth elements are formed. The insoluble thorium, uranium and rare earth compounds are then separated from the aqueous solution of sodium hydroxide, sodium phosphate and sodium silicate by a filtration step. The precipitate is dissolved in a strong mineral acid, preferably hydrochloric, and this acid solution is then neutralized to a pH of approximately 5.6 with a hydroxide solution. Uranium and thorium oxides are thus precipitated, leaving the rare earths in solution. A filtration step is then performed and the rare earths are separated from the filtrate by further neutralization of the filtrate with an aqueous hydroxide whereby the rare earth hydroxides are precipitated. These can be separated from the solution by a filtration step. The thorium and uranium hydroxides which were separated from the rare earths by the preceding precipitation step are then dissolved in an aqueous mineral acid solution, preferably nitric acid. This solution is filtered to remove the insoluble residue, which is principally gangue. The soluble thorium and uranium values are then separated from the aqueous filtrate by a liquid-liquid extraction step, preferably using a dilute tributyl phosphate organic solvent as the extractant. During the coextraction of the thorium and uranium values into the organic solvent the free acidity of the aqueous phase is maintained above about 3 N nitric acid whereby most of the impurities are retained in the aqueous phase. The thorium values are then selectively back-extracted from the organic phase by contacting the organic phase with an aqueous nitric acid solution having an acidity of less than about 1 N. The thorium may be recovered from the aqueous dilute nitric acid solution by contacting the solution with oxalate ion whereby a thorium oxalate precipitate is formed. This thorium oxalate precipitate is recovered by filtration or other conventional methods. The uranium values are then extracted from the organic phase by contacting the organic phase with an aqueous medium stripping solution, such as deionized water or an aqueous carbonate solution. The uranium can be recovered from the stripping solution by neutralizing the solution with hydroxide ion whereby uranium hydroxide is precipitated.

A flow diagram of the process for the purpose of illustrating the essential steps thereof is shown in the attached drawing. The diagram is self-explanatory. The steps in the diagram are not to be considered as limitations on the scope of the process, but are merely illustrative.

The dissolution of the monazite sand is effected by digesting the monazite sand concentrate with an aqueous solution of an alkali hydroxide, preferably sodium hydroxide. The mesh size of the monazite sand concentrates, the sodium hydroxide to sand ratio, the time of reaction, and the temperature of the reaction mixture all have an effect upon the completeness of the dissolution. It has been found that in general the finer the sand the more quickly the reaction goes to a reasonable completeness. By reducing the particle size of the monazite sand to 100% —325 mesh, the severity of the reaction conditions required to decompose essentially all of the sand is reduced. The weight of the stoichiometric amount of sodium hydroxide required to convert all of the rare earth phosphates to rare earth hydroxides is equivalent to about one-half the weight of the monazite. Increasing the sodium hydroxide to monazite ratio increases the amount of decomposition of the sand, but the rate of increase decreases markedly above a sodium hydroxide to sand ratio of 3.

The rate of reaction between the monazite sand concentrates and the aqueous sodium hydroxide increases with the temperature. However, the maximum temperature is practically limited under open air digestion conditions to about 400° F., since above this temperature the reaction mass becomes too dry and thick to handle conveniently as a result of loss of water by evaporation. The sand may, of course, be digested under pressure, but the improved results obtained by this method are usually not sufficiently better than the open air digestion to warrant the increased difficulty of pressure digestion. While satisfactory digestion may be obtained with considerable variation in one or more of the above-mentioned variants by corresponding changes in the other variants, a particularly desirable reaction condition is a sodium hydroxide to sand ratio of 1.5, a soduim hydroxide to water concentration of about 45%, a reaction temperature of 280° F. and a reaction time of 2 hours, as applied to a monazite sand concentrate of a fineness of —325 mesh.

The digestion is normally effected by introducing concentrated aqueous sodium hydroxide solution into the container of sand and maintaining the container at the desired temperature with agitation during the digestion period. Considerable variation in the sodium hydroxide concentration is permitted. A concentration of between 30 and 70% is permissible; however, a concentration between 30 and 45% has given the best results.

Following the digestion step the reaction slurry is diluted to about 30% sodium hydroxide prior to filtration. At this concentration and a filtration temperature of about 212° F., the sodium phosphate formed by the sodium hydroxide dissolution will remain in solution. The solids in the reaction slurry are then separated from the liquid by any conventional method of separating solids from liquids, such as filtration, centrifugation, etc. It is desirable to maintain the slurry at a temperature of greater than 140° F., and preferably about 212° F., during the filtration in order to retain the sodium phosphate in solution. The filtrate is comprised primarily of sodium phosphate and sodium hydroxide and the residue is primarily the hydrous oxides of the rare earths, thorium and uranium. Following filtration the hydrous metal oxides are usually washed to reduce further the phosphate concentration. Two washes with volumes equal to that of the diluted reaction slurry will reduce the soluble phosphate content of the hydrous metal oxide cake to a satisfactory concentration.

Since a substantial excess of sodium hydroxide is used in the dissolution step, it is desirable to recover this excess sodium hydroxide from the filtrate. It is also desirable to separate the sodium phosphate, since this is a desirable byproduct of the reaction. The recovery of these products is accomplished by a concentration and crystallization step.

The filtrate is preferably concentrated by evaporation to a concentration of about 0.5 liter of liquid per 100 grams of monazite sand. The concentrated solution is allowed to cool to room temperature, at which temperature and concentration $Na_3PO_4 \cdot 10H_2O$ crystallizes out of solution. The sodium phosphate crystals can then be removed from the sodium hydroxide solution by conventional methods and the sodium hydroxide filtrate remaining may be recycled into the over-all separation process.

The sodium hydroxide recovered in this manner, however, contains a small silica content which tends to build up upon recycling. This silica content apparently carries a small portion of the uranium values, so that continued usage of the entire sodium hydroxide is inadvisable since it will tend to decrease the uranium recovery. It has, however, been found that approximately half of the excess sodium hydroxide can be recycled satisfactorily to the original dissolution stage, with the other half of the recovered sodium hydroxide being used in later operations in the over-all process.

The method of dissolving monazite sand concentrates and of recovering sodium hydroxide and sodium phosphate following the dissolution is more fully described in copending application Serial No. 251,564, Method of Processing Monazite Sand, George D. Calkins, filed October 16, 1951, the specification of which is herein incorporated by reference.

The washed hydrous metal oxides cake is dissolved in a strong acid, such as nitric, hydrochloric or sulfuric. It has been found that dissolution in nitric acid or sulfuric acid, however, gives much less desirable recovery ratios than does dissolution in hydrochloric acid. Even with an excess of 71% nitric acid heated almost to the boiling point, the hydrous oxides cannot be completely dissolved without the addition of an agent such as hydrogen peroxide, and in the presence of hydrogen peroxide the dissolution of thorium is only about 50% complete.

It was found that the hydrous oxides could readily be dissolved in 37% by weight hydrochloric acid at a temperature of 175° F. As little as 1½ pounds of 37% acid to 1 pound of sand (initial weight) were sufficient. This is equivalent to about 125% of the theoretical requirements of hydrochloric acid. Other acid concentrations and temperatures may, of course, be used by appropriately adjusting the temperature or time of reaction. While substantially all of the rare earths, thorium and uranium values are dissolved by this step, a small amount of insoluble material (mostly rutile, silica, and zircon) is not dissolved and, while this could be separated from the solution by settling at this point in the process, it usually is carried on to the subsequent step.

While hot (160° F.) concentrated sulfuric acid is effective in dissolving the thorium and uranium values, the sulfuric acid tends to form an anionic complex with the uranium values, making it difficult to recover the uranium values in the later steps of the present process.

Several methods may be employed for separating the uranium and thorium values from the rare earths values which are obtained in the acid dissolution step preceding. For example, thorium and uranium are coprecipitated by hydrogen peroxide from the acid solution by neutralizing the solution to a pH of about 2. The rare earth peroxides are very soluble at this pH. Precipitation of the thorium and uranium is substantially quantitative, the thorium peroxide serving as a carrier for the uranium peroxide.

A less expensive, and therefore preferable, method, however, is the selective hydroxide precipitation of uranium and thorium from the acid solution. In accordance with the preferred method, the hydrochloric acid solution is neutralized by the addition of an alkali hydroxide, such as ammonium hydroxide or sodium hydroxide, to a pH of 5.2–6.2, and preferably a pH of about 5.8. It is desirable to maintain constant agitation during neutralization to avoid local precipitation. It is also desirable to add the alkali slowly during the final stages of neutralization, since the pH changes very rapidly with small additions of alkali during this period. No heating or digestion is required following neutralization.

The concentrated acid chloride solution containing the rare earths, uranium and thorium is normally diluted somewhat with water, before neutralization with the alkali hydroxide. This is done for several purposes. It has been found that there is a greater loss of rare earth hydroxides by precipitation when a solution containing a high concentration of rare earth hydroxides is neutralized. It is therefore desirable to have the concentration of rare earths in the solution to be neutralized in the range 6–8 grams per 100 ml. of solution, rather than in a higher range. It is also desirable to have the initial pH of the chloride solution to be neutralized not greater than about 0.5. The dilution to approximately this pH figure is desirable to avoid a high localized pH in the mixture during neutralization. In a typical example where the hydrochloric acid solution was first prepared by treating the moist hydrous oxide cake with 37% hydrochloric acid using an acid to sand ratio of 1.5, 0.2 gallon of concentrated chloride solution per pound of sand was obtained. This was diluted with three times its volume of water prior to precipitating the thorium and uranium. The neutralization was then accomplished by adding a 57% ammonium hydroxide solution until the pH of the solution reached 5.8.

A portion of the sodium hydroxide recovered in an earlier step of the process may be used to effect the neutralization. The caustic soda solution obtained in this manner, after concentration and removal of trisodium phosphate, is about 47% NaOH. This solution is usually diluted to reduce the NaOH content to about 30% in order to permit easier control of the neutralization step. From this point on, the procedure followed is the same as that used for ammonium hydroxide neutralization. The caustic soda requirement for partial neutralization of the chloride solution is about 0.19 pound of NaOH per pound of original monazite sand concentrate.

The precipitate may be separated from the supernatant solution by any conventional method for separating a solid precipitate from an aqueous solution.

The hydroxide cake from the filtration step contains essentially all of the thorium, uranium, iron, titanium and phosphate from the acid solution, along with the acid-insoluble residues from the sand. It is quite important that this cake be thoroughly washed before processing of the cake in order to effect the maximum removal of rare earth chlorides and any sizable amount of chloride ion remaining in the cake. Usually two thorough washings with water are sufficient to effect substantially complete removal of the rare earth hydroxides. In the third cycle it may be desirable to add an electrolyte, such as sodium nitrate, to the wash water to promote coagulation and settling of the solids. Digestion of the slurries formed with the wash water is attained by heating the solution to about 175° F. and then cooling slowly. This digestion is also desirable to promote rapid settling of the solids preliminary to decantation and filtration. Following the final washing of the cake, it may be desirable to dry the moist cake to reduce the liquid content thereof. However, the cake should not be completely freed of water, since when altogether dry the cake settles to a very hard mass and tends to dust easily. In general, drying the cake to a moisture content of about 30% has proven the most satisfactory for further processing.

The rare earths contained in the filtrate obtained in the preceding step are valuable by-products of the present process. These may be recovered from the filtrate by additional neutralization of the filtrate with an alkali hydroxide to precipitate the rare earth hydroxides. The by-product, sodium hydroxide, obtained in the earlier step of the process may be used for this further neutralization. It is again desirable to dilute this sodium hydroxide solution to make the sodium hydroxide content about 30% and then add it to the rare earth chloride solution. It has been found that the addition of about 0.35 pound of sodium hydroxide per pound of original monazite sand will completely precipitate the rare earths present in the chloride solution. The rare earth oxides may then be processed further by conventional methods, such as ion exchange, to remove the very small amounts of other contaminants, such as silica, iron and titanium, present in the rare earth oxide precipitate.

In the next step of the present process, the thorium is separated from the uranium by a solvent extraction step. In preparation for this step the thorium-uranium hydroxide cake is dissolved in an acid solution, and preferably a nitric acid solution. It was found, however, that a moderate amount of titanium was present in the hydroxide cake in the form of distinct particles of impure rutile and that, at certain stages of the dissolution and subsequent solvent extraction, this titanium tended to form a precipitate of titanium phosphate. The mechanism of the precipitation presumably involves a nitric acid-soluble thorium phosphate complex. At low nitric acid concentrations the phosphate present in the solution is associated with the thorium; however, at higher nitric acid concentrations this complex dissociates, thus freeing phosphate ions which form a precipitate with the titanium present. It was found that, by dissolving the hydroxide cake in a nitric acid solution of at least 7 M $HNO_3$ content, and preferably 9 M $HNO_3$, a heavy precipitate of titanium phosphate was thrown down. In order to prepare a suitable acid solution for the solvent extraction step, it is desirable that the thorium molarity in the feed solution should be between 0.2 and 0.4, and preferably between about 0.3 and 0.35 and the free nitric acid (not including nitrate salts) molarity should be between 7.0 and 7.5. It is therefore desirable to analyze the hydroxide cake before dissolution and to determine the amount of acid needed to form uranium and thorium nitrates. Sufficient nitric acid is then added to the cake to form a nitric acid solution having a free nitric acid molarity of at least 7. This solution is then digested, preferably by heating to approximately 175° F. for one hour, to insure complete dissolution of the cake and to precipitate the titanium phosphate. Following digestion, the solution is then filtered, a step which effectively removes the precipitated titanium phosphate and gangue material. A filter aid, such as commercial asbestos fiber material, may be used. The free nitric acid content of the filtrate is then adjusted to between 7.0 and 7.5 N.

The solvent extraction separation of uranium and thorium values from contaminants and from each other is the subject matter of the assignee's copending application, Serial No. 251,620, filed on October 16, 1951 by Edward G. Bohlmann, the specification of which is incorporated herein by reference.

The final separation of uranium and thorium values from the remaining rare earths, titania, phosphate and iron values by solvent extraction depends upon the fact that an organic solvent, comprising tributyl phosphate and an organic diluent, will extract uranium and thorium values from an aqueous feed solution containing greater than 1 M free $HNO_3$, and preferably between 5 and 7 M $HNO_3$, leaving the above-mentioned impurities in the aqueous solution; the thorium may then be stripped from the organic phase by contacting the organic phase with an aqueous solution of 0.1–1.0 M nitric acid concentration. The distribution of thorium is in favor of the aqueous phase, while that of uranium is in favor of the organic phase. The uranium may finally be stripped from the solvent with water, since at very low nitric acid and uranium concentrations the distribution of uranium is in favor of the aqueous phase.

The tributyl phosphate (which may hereafter be referred to as TBP for convenience) has a high viscosity and density so that it is desirable to use an organic diluent to obtain a TBP organic solvent satisfactory for use as an extractant in countercurrent column operation. The diluent which must mix with TBP should have a low viscosity, density, reducing power, iodine number, aromaticity and settling time. The flash point should be high and the stability toward nitric acid should be good. (The aromaticity is a phase of the nitric acid stability, since aliphatic hydrocarbons are generally more stable toward nitric acid than aromatic hydrocarbons.) Diluents such as dibutyl ether and hexane may be used; however, it has been found that commercial hydrocarbon kerosene fractions were more suitable on the basis of flash point and viscosity. A naphtha having a flash point of 158° F., a specific gravity of 0.773, an ASTM boiling range of 371–498° F. and a very slight amount of aromatics contained therein was found to be most suitable. It was found, however, that diluents containing substantial amounts of long-chain paraffinic hydrocarbons had one disadvantage. During equilibrations of equal volumes of solvent, diluent and an aqueous solution of 6 M nitric acid containing thorium, the diluent was found to separate from the solvent, forming a three phase system. The presence of aromatics and cycloparaffins in the diluents seemed to inhibit the tendency toward separation and it was found that the phase separation did not occur with a naphtha diluent when contacted with an aqueous thorium solution having a thorium concentration below 0.3 M. It is therefore desirable to have an aqueous feed containing not greater than 0.3 M thorium when it is to be contacted with an organic solvent containing a diluent of the naphtha type. Other conventional TBP organic extractant solvents may also be used. While considerable variation in the concentration of TBP and diluent is permissible, a TBP to diluent ratio of about 1:1 has been found to be entirely satisfactory for column operation.

The TBP used should be free of mono- and dibutyl phosphates, since these esters form complexes with thorium and uranium. It is therefore desirable to wash the TBP with sodium hydroxide or sodium carbonate prior to use in order to remove the mono- and dibutyl phosphates.

Experiments were carried out to determine the distribution coefficients of the major components of the process nitrate solutions (obtained by dissolving the hydroxide cake after separation of the bulk of the rare earths and the bulk of the titanium in the preceding step). The coefficients were determined by a batch extraction of the uranium and thorium from the aqueous solution. The organic solvent used was 50% TBP and 50% a commercial kerosene fraction solvent having a flash point of greater than 100° F., a specific gravity of 0.786, an ASTM boiling range of 300–400° F., and containing a considerable amount of aromatics. The analysis of the aqueous solution is shown in Table I. The molarity of the nitric acid concentration of the various samples is also shown in Table I. A graphic illustration of the distribution coefficients is shown in Fig. 2.

TABLE I

*Effect of nitric acid concentration on distribution coefficients from process solutions* [1]

| Molarity of HNO$_3$ | $E_a°$ (Single-Stage Extraction) | | | | | |
|---|---|---|---|---|---|---|
| | U | Th | RE | Ti | P | Fe |
| 0.5 | 13 | 0.32 | 0.069 | <0.002 | <0.003 | 0.011 |
| 1.0 | 23 | 0.68 | 0.072 | <0.002 | 0.011 | 0.021 |
| 3.0 | 47 | 1.5 | 0.065 | <0.003 | 0.007 | 0.018 |
| 5.0 | 55 | 2.5 | 0.046 | <0.003 | 0.007 | 0.024 |
| 7.0 | 12 | 3.7 | 0.028 | 0.005 | 0.007 | 0.26 |
| 9.0 | 27 | 4.5 | 0.032 | <0.002 | <0.003 | 0.12 |

NOTE.—Allowing for analytical error, the coefficients for TiO$_2$, P$_2$O$_5$ and Fe$_2$O$_3$ are generally of the order <0.003, 0.007, and 0.025, respectively.
[1] Composition of feed solution:

| mg./100 ml. | | | | | |
|---|---|---|---|---|---|
| U$_3$O$_8$ | ThO$_2$ | (RE)$_2$O$_3$ | TiO$_2$ | P$_2$O$_5$ | Fe$_2$O$_3$ |
| 56 | 3,712 | 1,144 | 344 | 528 | 248 |

The organic and the aqueous phases may be brought in contact with each other by batch methods, by countercurrent column extraction with either packed columns, unpacked columns or pulse columns, by mixer-settler apparatus, or by other conventional methods for carrying out solvent extraction processes. The use of scrub solutions is desirable. An aqueous nitric acid solution having a molarity similar to the molarity of the nitric acid in the aqueous feed solution is effective in scrubbing the small amount of rare earths extracted into the organic solution in the first step. A ratio of feed to organic extractant of 1:1.5 is a satisfactory minimum when the feed to scrub ratio is 1:0.5. This ratio is based upon the minimum conditions required to extract greater than 99% of the thorium and uranium and to reduce the rare earth concentration based on the thorium to less than 1 part per million. Other ratios may be used if such a high degree of separation is not required.

As shown by the distribution curves of Fig. 2, the thorium values may be stripped from the organic solution, leaving the uranium values in the organic solution, by contacting the organic solution with an aqueous nitric acid solution containing less than 1 M HNO$_3$. The thorium stripping solution is preferably between 0.1 and 1 N nitric acid, and preferably about 0.2 M HNO$_3$. An organic scrub solution consisting of 50% TBP–50% diluent and 0. to 0.4 M in nitric acid may be used to wash the small amounts of uranium stripped with the thorium back into the organic scrub solution.

The uranium may then be stripped from the organic solvent by contacting the solvent with water. In a typical process example, essentially complete stripping of the uranium from a TBP-naphtha organic solvent was obtained at a feed:extractant ratio of 1:0.4, using a countercurrent-type column.

The thorium can be recovered from the nitric acid stripping solution by a precipitation step, for example, precipitation of the thorium with oxalate. A 5% excess of oxalate over the stoichiometric amount was found to substantially completely precipitate the thorium present. Some additional purification of the thorium is obtained by an oxalate precipitation, since, while the thorium oxalate is insoluble, the oxalates of some of the impurities, (U, Fe and Ti) are soluble in solutions of nitric acid. The nitric acid content of the typical thorium strip solution does not affect the precipitation.

The uranium may be obtained from the uranium strip solution by precipitating a uranyl hydroxide precipitate with an alkali hydroxide, such as ammonium hydroxide. Since the uranium strip solution usually contains very little free acid, only a small excess (5%) of alkali hydroxide is usually required to precipitate the uranium essentially completely.

Now that the process of the present invention has been generally described, it may be further illustrated by the following example.

EXAMPLE

A sample of 10 pounds of monazite sand was selected. The analysis of the sand was as follows:

| | Percent |
|---|---|
| ThO$_2$ | 6.50 |
| U$_3$O$_8$ | 0.17 |
| (RE)$_2$O$_3$ | 59.2 |
| P$_2$O$_5$ | 26.0 |
| TiO$_2$ | 1.75 |
| Fe$_2$O$_3$ | 0.51 |
| SiO$_2$ | 2.16 |

The sand was reduced in size by ball milling, using flint pebbles, until the sand size was 3.5% −200 to −325 U. S. sieve series mesh size and 96.5% −325 mesh size. The discharge from the mill was allowed to settle and the supernatant water was removed until the sand and water slurry contained 39% of water. This sand slurry was then fed to a stainless steel reaction vessel fitted with external electrical heaters, a variable speed agitator, a flush bottom valve, and a thermocouple. A 73% NaOH caustic soda solution was then introduced into the reactor vessel with a ratio of NaOH to sand of 1.5 and a ratio of water to sand of 1.7. This mixture was then heated to a temperature of 280° F. and maintained there with moderate agitation for 3 hours. This was sufficient time for the sand to react completely with the caustic soda. The rare earths reacted according to the following reaction, in which R indicates rare earths:

$$2\ RPO_4 + 6\ NaOH \rightarrow R_2O_3 \cdot 3H_2O + 2\ Na_3PO_4$$

The silica formed a soluble sodium silicate and the uranium formed an insoluble sodium uranate.

After complete reaction, the sand-NaOH slurry was diluted with water to about 20% caustic soda concentration in order to keep the sodium phosphate in solution. This solution was then digested at its boiling point (220° F.) for one hour and then filtered. Its volume at this time was about 0.7 gallon per pound of original sand charged.

Filtration of the digested slurry to remove the hydrous oxides from the solution of trisodium phosphate and excess caustic soda was performed at a temperature of 180° F. under pressure of about 60 pounds per square inch. At completion of the filtration, the hydrous oxide cake was washed in the filter with water until practically all of the soluble elements in the cake were removed. The wash solution was saved and recycled to a subsequent reaction batch for the dilution of the sodium hydroxide-hydrous oxides slurry prior to filtration. The hydrous oxides cake was blown dry with compressed air and sent on to the acid dissolution vessel. The hydrous oxides cake at this point contained the following quantities of the constituents charged in the monazite sand: 96.9% uranium, 100% thorium, 100% rare earths and 0.3% phosphorus.

The NaOH-Na₃PO₄ filtrate from the reaction contained unchanged about ⅔ of the caustic soda introduced in the reaction. The other ⅓ had been converted to trisodium phosphate. Both the caustic soda and trisodium phosphate remained undissolved in the filtrate as long as its temperature was maintained above about 140° F. The filtrate was evaporated in an open kettle until its boiling point reached 275° F., corresponding to an NaOH concentration of about 47%. At this concentration 99% of the trisodium phosphate had crystallized out of solution and this was removed by filtration. The caustic soda liquor was available for use in other parts of the process.

The hydrous oxide cake obtained in the first filtration was placed in a reactor and to it were added 1½ pounds of 37% hydrochloric acid per pound of sand. The mixture was then heated to 175° F. for one hour, resulting in complete dissolution of all the essential material in the cake. A small portion of the cake, consisting mostly of unreacted gangue, principally rutile and zircon, remained insoluble in the acid and was carried along as suspended solid matter.

The acid solution was then transferred to a neutralization vessel and diluted with water to a pH of about 0.5. The composition of the solution after dilution was as follows:

| Constituent | Concentration, Grams per Liter |
| --- | --- |
| U | 0.21 |
| Th | 8.4 |
| RE | 74 |
| Fe | 0.85 |
| Ti | 1.3 |
| P | 0.05 |
| Cl | 24 |

The diluted hydrochloric acid solution of the hydrous oxide cake was then partially neutralized by the addition of a sodium hydroxide solution. This operation was carried out at room temperature in an open stoneware vessel fitted with a high speed agitator. The sodium hydroxide solution used was a portion of the caustic soda liquor recovered as a by-product in an earlier operation step, diluted with water to a NaOH content of about 30%. It was added to the acid solution until an equilibrium pH of about 5.8 was reached. The dilution of the caustic soda solution and the acid solution with water was to make the precipitation at this point more nearly homogeneous. The dilution of the slurry and the continuous agitation minimized any effect of high localized pH during precipitation. At a pH of 5.8 substantially all of the thorium and uranium were precipitated, and about 3% of the total amount of rare earths. The balance of the rare earths remained in solution as chlorides. The iron, titanium and phosphorus values and gangue present were also contained in the precipitate. After its neutralization, the slurry was allowed to settle, the supernatant liquor then decanted, and the slurry finally filtered. The precipitate was then repulped and filtered twice more to remove all occluded and retained liquor. The final wash water contained 0.5% of sodium nitrate to improve the flocculating and settling characteristics of the solid. The slurries formed during the repulping were first permitted to settle and then the supernatant water decanted before filtration was carried out. A brief heating of the slurries hastened their settling. The final thorium-uranium hydroxides wet cake was oven-dried at 220° F. to a cake having constant weight and a moisture content of about 29%.

The combined decantates and filtrates from the separation and washing of the selectively precipitated thorium-uranium cake contained about 97% of the rare earths as chlorides in solution. Sufficient sodium hydroxide solution was added to neutralize the acidity of the rare earth-containing chloride solution and thereby precipitate substantially all of the rare earths present in the solution as rare earth hydroxides. This rare earth precipitate was then recovered by filtration.

The thorium-uranium hydroxides cake was analyzed and sufficient nitric acid added to form a nitric acid solution containing the dissolved cake having a free nitric acid concentration of 9 M and 0.36 M in thorium nitrate. The nitric acid came from two sources, 10 M acid (48.5% HNO₃ by weight) from a nitric acid-recovery still operated in conjunction with the process, and 16 M acid (71% HNO₃ by weight) from storage. A titanium phosphate precipitate formed in the nitric acid solution. The resulting slurry was digested at 175° F. for one hour, cooled, and then filtered, thus removing the insoluble titanium phosphate and the insoluble gangue material. The insoluble precipitate, after separation, was washed with a small amount of water and this water was then added to the filtrate. The filtrate solution was then adjusted so as to be 0.3 M in thorium and 7.5 M in free HNO₃.

The thorium-uranium values were then further purified by extraction from the aqueous nitric acid solution into an organic solvent and the thorium was then separated from the uranium by selectively stripping first the thorium and then the uranium from the solvent. The organic solvent used was a mixture of 50% by volume of tributyl phosphate and a commercial naphtha which was a highly purified kerosene fraction.

The equipment used to obtain intimate contact between the aqueous and organic phases for each step of the countercurrent extraction was a one-inch multi-stage column consisting of a series of 14 mixing stages, separated by calming sections. The mixing was accomplished by agitators attached to a shaft situated in the center of the column. The calming sections contained fine wire mesh (stainless steel) wrapped around this shaft.

The aqueous nitric acid solution was introduced about one-third of the way from the top of the column. The organic extractant entered at the bottom of the column. A scrub solution consisting of a 6 M aqueous nitric acid solution was introduced at the top of the column to back-extract the small amounts of impurities extracted into the organic solvent. The volume ratios of scrub:feed:solvent were 0.5:1.0:1.5. The thorium and uranium were extracted into the organic phase under these conditions, whereas the rare earths, iron, titanium and phosphorus substantially remained in the aqueous phase. Analysis showed that the thorium and uranium were extracted into the organic solvent with a greater than 99% efficiency, whereas the resultant organic phase contained less than 44 parts of rare earth, 100 parts of iron, 200 parts of titanium, and 70 parts of phosphorus (PO₄⁼) per million parts of thorium.

The next step in the solvent extraction operation was the separation of the thorium from the uranium and the organic solvent. The thorium was stripped by countercurrent extraction in the column with a 0.5 M aqueous HNO₃ solution. The organic feed solution, which was about 1.0 M in nitric acid, was introduced near the center of the column. The strip solution, deionized water, entered at the top of the column. While nitric acid was not added directly to the aqueous stripping solution, a sufficient amount of the acid transferred from the organic phase to the aqueous phase in the top section of the column to keep the uranium in the organic solvent. A scrub solution consisting of 50% TBP and 50% commercial naphtha, which had been made 0.4 M in nitric acid, was used at the bottom of the column to wash small amounts of uranium from the aqueous phase back into the organic phase. The volume ratios of the strip:feed:scrub were 1.5:1:0.5. The concentration of uranium in the aqueous thorium product solution was less than 15 parts per million parts of thorium.

The final step in the solvent extraction operation was the removal of the uranium from the organic solvent. This was also performed in the column described. By stripping the solvent with deionized water during the thorium back-extraction step, the nitric acid concentration of the organic solvent had been reduced during the initial stripping step to a value ($<0.05$ M) low enough so that it was possible to strip the uranium into a volume of deionized water one-third that of the organic phase.

The thorium values contained in the aqueous thorium product solution from the selective stripping column were precipitated by contacting the solution with a 5% excess of a 10% oxalic acid solution. The precipitate was removed by filtration and then washed to remove any soluble impurities. The aqueous uranium product solution was neutralized with ammonium hydroxide, thereby precipitating the uranium values in the form of uranyl hydroxide. The uranyl hydroxide was separated from the solution by filtration and washed.

It will be apparent to those skilled in the art that the basic method and modifications thereof set forth provide a simple and practical process for the procurement of a high degree of recovery for uranium, thorium and rare earths from ores. While this invention has been illustrated by restricted applications thereof, it is not desired that it be specifically limited thereto since it is manifest to those skilled in the art to which the present invention is directed that it is susceptible to numerous modifications without departing from the scope thereof. For example, individual steps and sequences of steps may be adapted for the recovery of any one of the constituents of monazite ores and modifications in the process, for example, the substitution of ion exchange methods for the final solvent extraction recovery and separation of uranium and thorium, may be made. It will therefore be understood that this invention is not to be limited to the details given herein, but that it may be modified within the scope of the appended claims.

What is claimed is:

1. A method for processing a phosphatic ore containing rare earths and thorium which comprises dissolving the finely divided ore in a concentrated sodium hydroxide aqueous solution, digesting said solution at an elevated temperature, diluting said solution to approximately a 30% sodium hydroxide concentration whereby the hydroxides of thorium, uranium and the rare earths are precipitated, separating the hydrous oxides precipitate from the supernatant solution, dissolving said precipitate in a hydrochloric acid aqueous solution, neutralizing said resultant solution with sodium hydroxide to a pH of 5.2–6.2 whereby the thorium and uranium hydroxides are precipitated leaving the rare earths in solution, separating the precipitate from the supernatant solution, dissolving said precipitate in nitric acid, adjusting the normality of the free acid to 7–9 N whereby titanium phosphate is precipitated, separating said precipitate from the solution, diluting the solution to 1–7 N free acid, contacting said solution with a tributyl phosphate organic extractant whereby the uranium and thorium are extracted from the aqueous solution, separating the organic extractant from the aqueous solution, contacting the organic extractant with a 0.1–1 N aqueous $HNO_3$ solution whereby the thorium is extracted into the aqueous solution, separating the aqueous solution from the organic extractant, and contacting the organic extractant with water whereby the uranium is extracted into the water.

2. The method of processing monazite sand which comprises contacting a finely divided concentrate of said sand with concentrated aqueous sodium hydroxide and digesting the product at elevated temperatures whereby a hydrous oxides precipitate is formed, diluting the digested slurry to a 30% NaOH content while maintaining the slurry at greater than 140° F., filtering the hydrous oxides precipitate from the slurry while maintaining the slurry at a temperature greater than 140° F., evaporating the filtrate which contains NaOH and $Na_3PO_4$ to a highly concentrated state, crystallizing the sodium phosphate in the solution and separating the crystals from the concentrated sodium hydroxide solution; dissolving the hydrous oxides precipitate in concentrated aqueous hydrochloric acid, diluting the resultant solution to a pH of approximately 0.5, neutralizing the solution with an alkali hydroxide to a pH of 5.2–6.2 whereby uranium and thorium hydroxides are precipitated, separating the resultant uranium-thorium hydroxide precipitate from the supernatant solution, contacting the solution with additional alkali hydroxide until substantially all of the rare earths present therein are precipitated as hydroxides, separating and recovering said rare earth hydroxides from the supernatant liquid; washing the uranium-thorium hydroxide cake with water, drying said cake to approximately 30% moisture content, dissolving said cake in nitric acid in sufficient quantity to produce a solution having 7–9 N free acidity, separating the titanium phosphate precipitate thus formed from the supernatant solution, diluting the supernatant solution to 5–7 N free nitric acid concentration, contacting said solution with a tributyl phosphate organic extractant and with an aqueous nitric acid scrub solution, separating the organic extractant together with associated thorium-uranium values from the aqueous phase, contacting the organic extractant with a 0.1–1 N aqueous nitric acid solution and a tributyl phosphate organic scrub solution containing 0.1–1 N $HNO_3$ whereby the thorium is extracted into the aqueous phase, separating the thorium-containing aqueous phase from the organic phase, contacting the aqueous thorium-containing phase with a source of oxalate ions whereby thorium oxalate is precipitated, recovering said thorium oxalate; contacting the remaining organic uranium-containing phase with water whereby the uranium values are extracted into said water phase, neutralizing the resultant aqueous phase with an alkali hydroxide whereby uranyl hydroxide is precipitated, and recovering said uranyl hydroxide.

3. The method of processing monazite sand which comprises grinding said sand until substantially all particles are less than −300 mesh, dissolving the resultant concentrate in 30–70% aqueous NaOH solution, digesting the resultant solution for approximately 3 hours at not less than 280° F. whereby a hydrous oxide precipitate of thorium, uranium and rare earths is formed, diluting the resultant solution to a 30% NaOH content, filtering the solution while maintaining it at approximately 212° F. and recovering the sodium phosphate from the filtrate by evaporation and crystallization; dissolving the hydrous oxide precipitate in 37% HCl at elevated temperatures, diluting the resultant solution to a rare earth concentration of approximately 6.8 grams per 100 ml. and to a pH of 0.5, neutralizing the resultant solution with 30% NaOH solution to a pH of approximately 5.8 with continuous agitation whereby a thorium-uranium hydroxide precipitate is formed, removing the resultant thorium-uranium hydroxide precipitate from the supernatant solution, precipitating the rare earths from the supernatant as the hydroxides by contacting the supernatant solution with about 0.35 pound of 30% aqueous NaOH per pound of original monazite concentrate; washing the uranium-thorium hydroxide filter cake twice with water, drying said filter cake to a 30% moisture content, dissolving said dried cake in a sufficient amount of aqueous concentrated $HNO_3$ to obtain a resultant solution having a free hydrogen ion concentration of 7–9 M and thorium ion concentration of 0.3–0.35 M, separating the titanium phosphate precipitate thus formed, diluting the supernatant solution to a nitric acid concentration of 5–7 M, contacting the resultant aqueous feed solution with an organic extractant comprising approximately 50% tributyl phosphate and 50% kerosene, in a ratio of feed to extractant of approximately 1 to 1.5 and with an aqueous 3–9 N $HNO_3$ scrub solution in a ratio of feed to scrub of approximately 1 to 1.5 whereby the uranium and thorium values are extracted into the organic phase, separating the organic phase from the aqueous phase, then contacting the organic phase with a 0.1–1 N aqueous $HNO_3$ solution and an organic 50% tributyl phosphate–50% diluent srub solution approximately 0.4 M in nitric acid whereby the thorium values are back-extracted into the aqueous phase, separating the aqueous phase from the organic phase, recovering the thorium from the aqueous phase by precipitating the thorium as the oxalate; and then contacting the organic phase with a deionized water aqueous phase whereby the uranium values are back-extracted into the aqueous phase, separating the aqueous uranium-containing phase from the organic phase and recovering the uranium from the aqueous phase by neutralizing the aqueous phase whereby uranyl hydroxide is precipitated.

References Cited in the file of this patent
FOREIGN PATENTS 39,105   India _____ Mar. 22, 1949

OTHER REFERENCES

Allen: Uranium and its Compounds, U. S. A. E. C. Paper No. TID–3041, p. 50, 1953.